(12) United States Patent
Jang et al.

(10) Patent No.: US 11,069,152 B2
(45) Date of Patent: Jul. 20, 2021

(54) FACE POSE CORRECTION APPARATUS AND METHOD

(71) Applicant: KOREA INSTITUTE OF ORIENTAL MEDICINE, Daejeon (KR)

(72) Inventors: Jun Su Jang, Daejeon (KR); Jun Hyeong Do, Daejeon (KR)

(73) Assignee: KOREA INSTITUTE OF ORIENTAL MEDICINE, Daejeon (KR)

( * ) Notice: Subject to any disclaimer, the term of this patent is extended or adjusted under 35 U.S.C. 154(b) by 0 days.

(21) Appl. No.: 16/605,126

(22) PCT Filed: Feb. 8, 2018

(86) PCT No.: PCT/KR2018/001678
§ 371 (c)(1),
(2) Date: Oct. 14, 2019

(87) PCT Pub. No.: WO2018/190504
PCT Pub. Date: Oct. 18, 2018

(65) Prior Publication Data
US 2020/0160615 A1    May 21, 2020

(30) Foreign Application Priority Data
Apr. 14, 2017 (KR) .......................... 10-2017-0048577

(51) Int. Cl.
*G06T 19/20* (2011.01)

(52) U.S. Cl.
CPC ...... *G06T 19/20* (2013.01); *G06T 2219/2004* (2013.01)

(58) Field of Classification Search
CPC ........... G06T 17/05; G06T 2207/30201; G06T 2207/30204; G06T 19/20
(Continued)

(56) References Cited

U.S. PATENT DOCUMENTS

| 10,839,481 B1 * | 11/2020 | Chen | G06T 3/0075 |
| 2009/0060290 A1 * | 3/2009 | Sabe | G06K 9/00248 382/118 |

(Continued)

FOREIGN PATENT DOCUMENTS

| JP | 4568607 B2 | 10/2010 |
| KR | 20050084263 A | 8/2005 |

(Continued)

OTHER PUBLICATIONS

Lee, Hye-Jung et al., "A Study on Creation of 3D Facial Model Using Fitting by Edge Detection Based on Fuzzy Logic," Journal of the Korea Institute of Information and Communication Engineering 14(12), Dec. 31, 2010, pp. 2681-2690.

(Continued)

*Primary Examiner* — Thomas J Lett
(74) *Attorney, Agent, or Firm* — Withrow & Terranova, P.L.L.C.; Vincent K. Gustafson

(57) ABSTRACT

Provided is a face pose correction apparatus for correcting a face pose, using a person-specific frontal model specialized for input three-dimensional (3D) facial data. The face pose correction apparatus may comprise: a generation unit for generating corrected first facial data by performing a 3D rigid transformation of input 3D facial data on the basis of a pre-stored 3D standard facial model; and a correction unit for generating a first subject-specialized frontal model which is a bilateral symmetry model of the first facial data, and correcting the first facial data by performing the 3D rigid transformation of the first facial data on the basis of the generated first subject-specialized frontal model.

12 Claims, 12 Drawing Sheets

(58) Field of Classification Search
USPC .......................................................... 345/424
See application file for complete search history.

(56) References Cited

U.S. PATENT DOCUMENTS

| | | | | |
|---|---|---|---|---|
| 2011/0116707 | A1* | 5/2011 | Kim | ................... G06K 9/00221 |
| | | | | 382/154 |
| 2015/0213307 | A1* | 7/2015 | Beeler | ..................... G06T 13/40 |
| | | | | 382/190 |
| 2018/0121713 | A1* | 5/2018 | Guo | .......................... G06T 7/30 |
| 2020/0272806 | A1* | 8/2020 | Walker | ............... G06K 9/00248 |

FOREIGN PATENT DOCUMENTS

| | | |
|---|---|---|
| KR | 101184097 B1 | 9/2012 |
| KR | 20140004604 A | 1/2014 |
| KR | 20150065445 A | 6/2015 |
| KR | 101660596 B1 | 9/2016 |
| KR | 101692493 B1 | 1/2017 |
| KR | 20170019779 A | 2/2017 |
| KR | 20170041005 A | 4/2017 |

OTHER PUBLICATIONS

International Search Report (Form PCT/ISA/210) for International Application No. PCT/KR2018/001678, dated May 8, 2018 (2 pages).
Written Opinion (Form PCT/ISA/237) for International Application No. PCT/KR2018/001678, dated May 8, 2018 (12 pages with English machine translation).

* cited by examiner

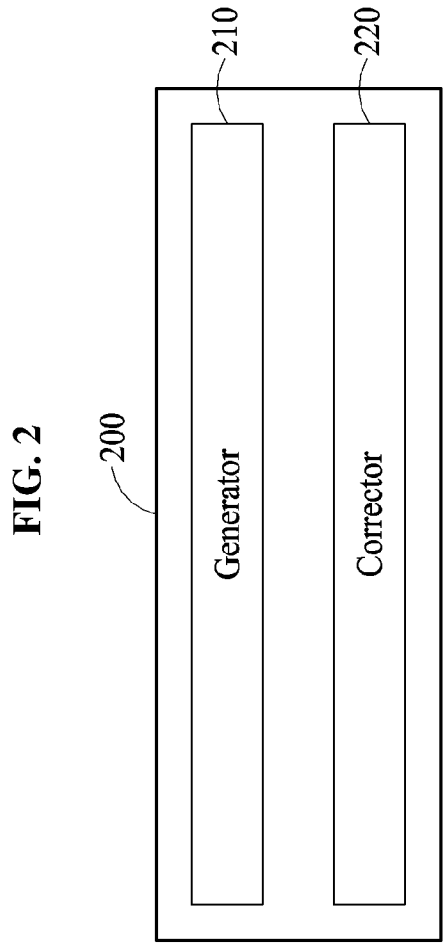

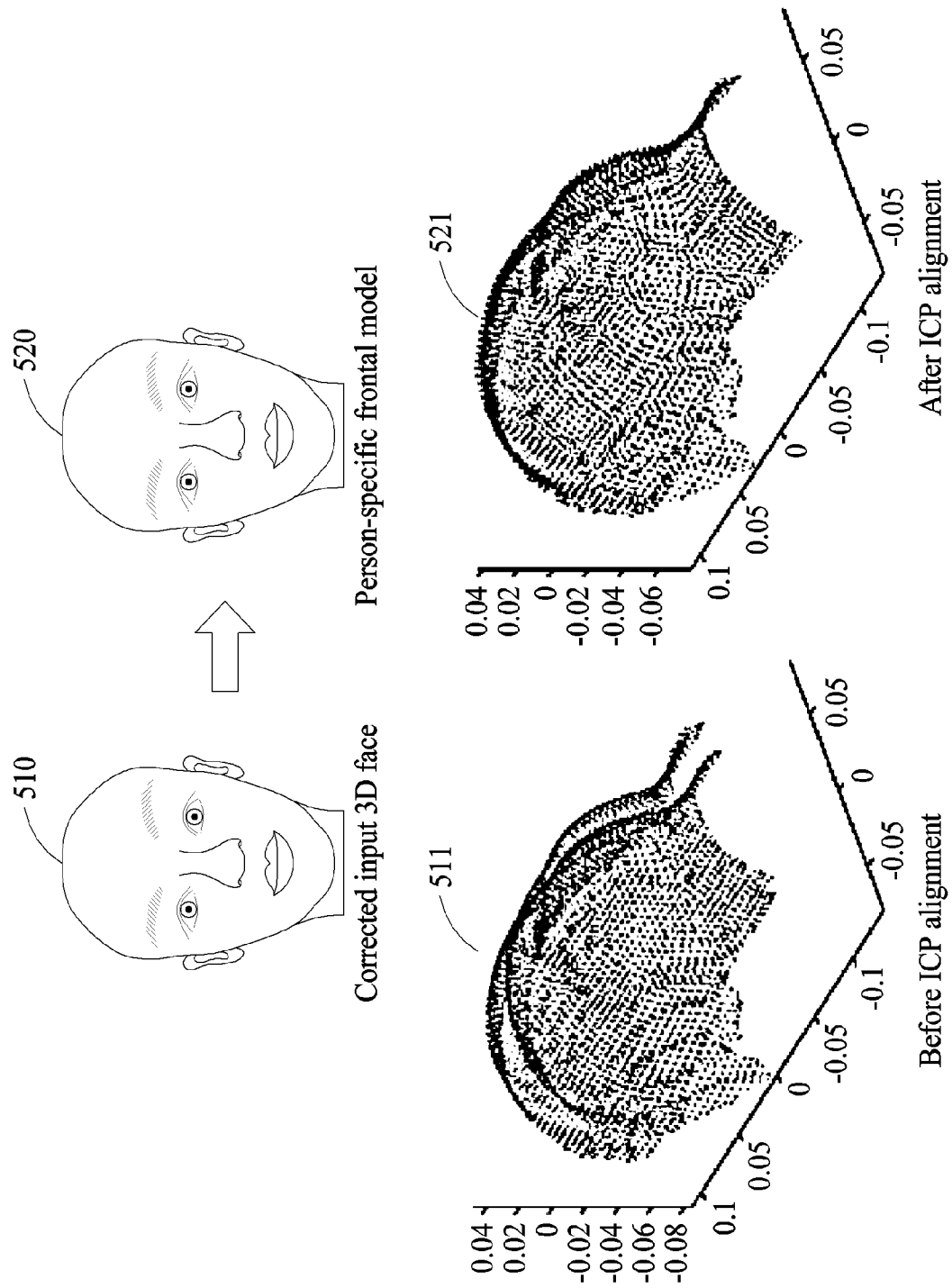

X-Z plane example

Y-Z plane example

FACE POSE CORRECTION APPARATUS AND METHOD

CROSS REFERENCE TO RELATED APPLICATION(S)

This application is a 35 U.S.C. § 371 national phase filing of International Application No. PCT/KR2018/001678 filed on Feb. 8, 2018, and further claims priority to Korean Patent Application No. 10-2017-0048577 filed on Apr. 14, 2017, wherein the disclosures of the foregoing applications are hereby incorporated by reference herein in their respective entireties.

TECHNICAL FIELD

Embodiments relate to technology that reduces fitting errors occurring during a process of aligning input three-dimensional (3D) facial data to a standard facial model to correct the input 3D facial data to a frontal pose, and more particularly, to an apparatus and method for correcting a face pose using a person-specific frontal model specialized for input 3D facial data.

BACKGROUND ART

Estimating a pose from facial data scanned as a 3D image is an emerging technology that may be utilized in various fields such as face recognition and education, as well as medical fields such as jaw joint correction and facial paralysis diagnosis. In particular, it is known that the issue of seeking a rigid transformation to estimate a frontal pose of facial data or to correct input 3D facial data to a frontal pose may be highly utilized.

In the past, a scheme of aligning input data based on a 3D standard facial model present as a frontal pose on the coordinate axes, or a scheme of correcting input data to a frontal pose by fitting a representative plane of a face frontal portion was principally used. In general, a 3D standard face is generated by averaging many items of facial data. If a morphometric difference between input 3D facial data to be corrected and the 3D standard facial model is great, errors occurring during alignment increase as well. Such alignment errors degrade the accuracy of correcting the pose of the facial data, and hinder repetition of pose correction.

DISCLOSURE OF INVENTION

Technical Solutions

According to an aspect of the present invention, there is provided a face pose correction apparatus for correcting a face pose using a person-specific frontal model specialized for input three-dimensional (3D) facial data. The face pose correction apparatus may include a generator configured to generate first facial data corrected by performing a 3D rigid transformation of input 3D facial data based on a pre-stored 3D standard facial model, and a corrector configured to generate a first person-specific frontal model which is a bilateral symmetry model of the first facial data, and correct the first facial data by performing a 3D rigid transformation of the first facial data based on the generated first person-specific frontal model.

The generator may include an extractor configured to extract a plurality of feature points from a two-dimensional (2D) facial image acquired by projecting the input 3D facial data, an estimator configured to estimate a pose of the input 3D facial data based on a correspondence of the extracted plurality of feature points with respect to the 3D standard facial model, a calculator configured to calculate a first transform vector for performing a rigid transformation of the estimated pose to a frontal pose, and a transformer configured to generate the first facial data by performing a rigid transformation of the input 3D facial data based on the first transform vector.

The corrector may include a model generator configured to generate the first person-specific frontal model by symmetrically transforming and copying voxels on a first plane to a second plane based on the axis Y of the first facial data, and a transform vector calculator configured to calculate a second transform vector for aligning the first facial data to the first person-specific frontal model using at least one of an iterative closest point (ICP) algorithm, a singular value decomposition (SVD) algorithm, and a pose from orthography and scaling with iteration (POSIT) algorithm, and correct the first facial data by performing a 3D rigid transformation of the first facial data based on the second transform vector.

Here, the transform vector calculator may be configured to compare a second value obtained by iteratively calculating the second transform vector to a first value which is a previous calculation result, and determine a final transform vector when a difference between the first value and the second value is less than a predetermined threshold as a result of the comparing.

The corrector may be configured to generate a second person-specific frontal model which is bilaterally symmetric on a predetermined coordinate plane of second facial data generated by performing a 3D rigid transformation of the first facial data, and additionally correct the second facial data by performing a 2D rigid transformation of the second facial data based on the generated second person-specific frontal model.

In this example, the model generator may be configured to remove a predetermined piece of coordinate axis information from the second facial data, and generate the second person-specific frontal model which is bilaterally symmetric based on two pieces of coordinate axis information. Further, the transform vector calculator may be configured to calculate a third transform vector for aligning the second facial data to the second person-specific frontal model using at least one of the ICP algorithm, the SVD algorithm, and the POSIT algorithm, and correct the second facial data by performing a 2D rigid transformation of the second facial data based on the third transform vector.

According to another aspect of the present invention, there is provided a face pose correction apparatus for correcting a face pose using a person-specific frontal model specialized for input 3D facial data. The face pose correction apparatus may include a generator configured to generate first facial data associated with a frontal face of a person based on at least one facial feature point obtained from input 3D facial data, and a corrector configured to generate a person-specific frontal model which is a bilateral symmetry model of the first facial data, and correct the first facial data by performing a 3D rigid transformation of the first facial data based on the generated person-specific frontal model.

The corrector may include a model generator configured to generate the person-specific frontal model by symmetrically transforming and copying voxels on a first plane to a second plane based on the axis Y of the first facial data, and a transform vector calculator configured to calculate a transform vector for aligning the first facial data to the person-specific frontal model using at least one of an ICP algorithm, an SVD algorithm, and a POSIT algorithm.

According to still another aspect of the present invention, there is provided a face pose correction method of correcting a face pose using a person-specific frontal model specialized for input 3D facial data. The face pose correction method may include generating first facial data corrected by performing a 3D rigid transformation of input 3D facial data based on a pre-stored 3D standard facial model, and generating a first person-specific frontal model which is a bilateral symmetry model of the first facial data, and correcting the first facial data by performing a 3D rigid transformation of the first facial data based on the generated first person-specific frontal model.

The generating of the first facial data may include extracting a plurality of feature points from a 2D facial image acquired by projecting the input 3D facial data, estimating a pose of the input 3D facial data based on a correspondence of the extracted plurality of feature points with respect to the 3D standard facial model, calculating a first transform vector for performing a rigid transformation of the estimated pose to a frontal pose, and generating the first facial data by performing a rigid transformation of the input 3D facial data based on the first transform vector.

The correcting of the first facial data may include generating the first person-specific frontal model by symmetrically transforming and copying voxels on a first plane to a second plane based on the axis Y of the first facial data, calculating a second transform vector for aligning the first facial data to the first person-specific frontal model using at least one of an ICP algorithm, an SVD algorithm, and a POSIT algorithm, and correcting the first facial data by performing a 3D rigid transformation of the first facial data based on the second transform vector.

Further, the correcting of the first facial data may further include comparing a second value obtained by iteratively calculating the second transform vector to a first value which is a previous calculation result, and determining a final transform vector when a difference between the first value and the second value is less than a predetermined threshold as a result of the comparing.

The face pose correction method may further include generating a second person-specific frontal model which is bilaterally symmetric on a predetermined coordinate plane of second facial data generated by performing a 3D rigid transformation of the first facial data, and additionally correcting the second facial data by performing a 2D rigid transformation of the second facial data based on the generated second person-specific frontal model.

In this example, the additionally correcting may include removing a predetermined piece of coordinate axis information from the second facial data, and generating the second person-specific frontal model which is bilaterally symmetric based on two pieces of coordinate axis information, calculating a third transform vector for aligning the second facial data to the second person-specific frontal model using at least one of an ICP algorithm, an SVD algorithm, and a POSIT algorithm, and correcting the second facial data by performing a 2D rigid transformation of second facial data based on the third transform vector.

BRIEF DESCRIPTION OF DRAWINGS

FIG. 2 is a block diagram illustrating a face pose correction apparatus according to an embodiment.

FIGS. 5A, 5B and 5C illustrate an example of generating a person-specific frontal model, and correcting a pose of 3D facial data using the generated person-specific frontal model according to an embodiment.

BEST MODE FOR CARRYING OUT THE INVENTION

Figure 1:
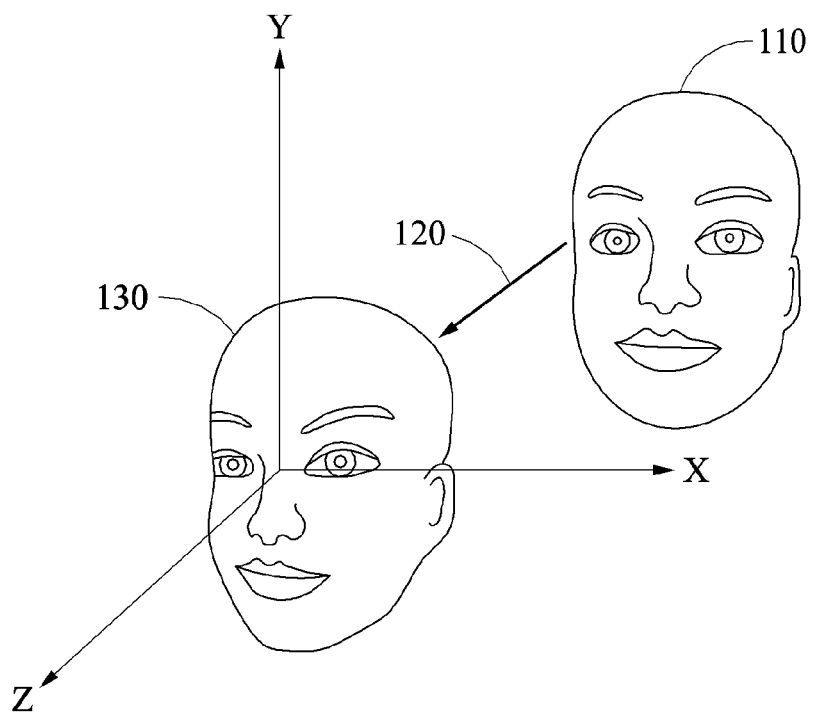
FIG. 1 illustrates a process of transforming three-dimensional (3D) facial data using a rigid transformation vector according to an embodiment.

The following structural or functional descriptions are exemplary to merely describe the embodiments, and the scope of the embodiments is not limited to the descriptions provided in the present specification.

Various modifications may be made to the examples. Here, the examples are not construed as limited to the disclosure and should be understood to include all changes, equivalents, and replacements within the idea and the technical scope of the disclosure.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly 8/etween", or "directly neighboring", etc., should be interpreted to be alike.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, the examples will be described in detail with reference to the accompanying drawings, wherein like drawing reference numerals are used for like elements.

FIG. 1 illustrates a process of transforming three-dimensional (3D) facial data using a rigid transformation vector according to an embodiment.

Referring to FIG. 1, input 3D facial data 110 may be generated as first facial data 130 of a frontal pose by a rigid transformation using a rigid transformation vector 120. The input 3D facial data 110 may be defined as a set of voxels corresponding to the face surface or a set of main landmark points (for example, main feature points such as pupil center points, eye tail points, and lip end points) of a face, and the points may each include 3D position information, grayscale information, and color information.

The input 3D facial data 110 may include position information which is defined based on the axes X, Y and Z, as shown in FIG. 1. The input 3D facial data 110 is information generated corresponding to a capturing direction from a capturing device, and thus the input 3D facial data 110 obtained from the capturing device may not necessarily match a frontal pose on the 3D coordinate axis. For the reliability and accuracy with respect to a result of analyzing a face of a person, it is importable to secure a frontal pose of facial data. The frontal pose may be defined as being bilaterally symmetric with respect to the axis Y in a state in which the axis Z is viewed from the front on the axes X, Y and Z of the global coordinate system. However, the coordinate axes shown in FIG. 1 are merely one of exemplary embodiments for describing the spirit of the present invention, and coordinate axis settings may be changed depending on user settings.

In FIG. 1, to transform the input 3D facial data 110 to the frontal pose, the rigid transformation vector 120 with respect to the input 3D facial data 110 needs to be calculated, and the first facial data 130 of the frontal pose may be generated by applying the calculated the rigid transformation vector 120 to the input 3D facial data 110.

Figure 3A:
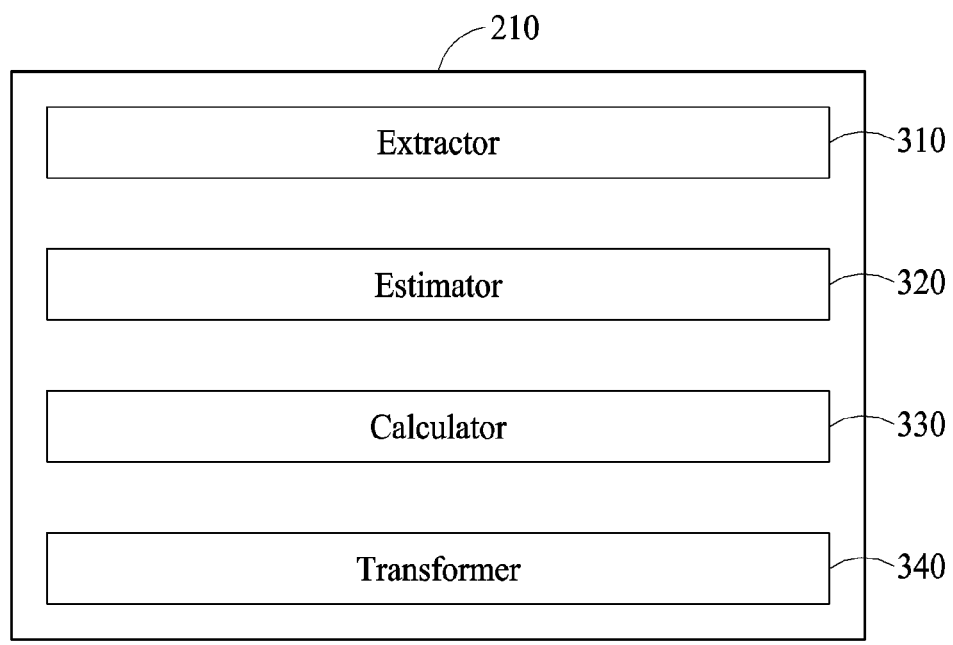
FIGS. 3A and 3B are block diagrams illustrating elements of a face pose correction apparatus according to an embodiment.
Figure 3B:
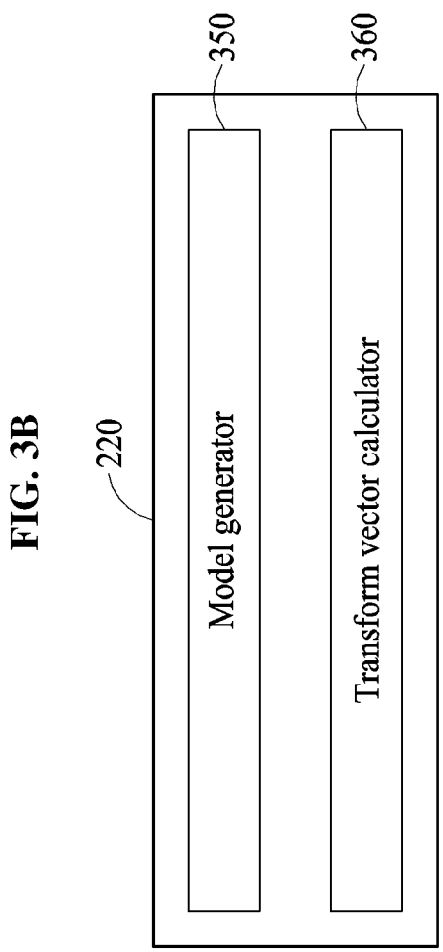

FIG. 2 is a block diagram illustrating a face pose correction apparatus 200 according to an embodiment, and FIGS. 3A and 3B are block diagrams illustrating elements of the face pose correction apparatus 200.

The face pose correction apparatus 200 may be a means to correct to a frontal pose using a person-specific frontal model specialized for facial data of a person, and may greatly reduce fitting errors occurring during a process of aligning input 3D facial data to a 3D standard facial model while performing a pose correction in a relatively simple manner. The facial feature point position information generating apparatus 200 may include a generator 210 and a corrector 220.

First, the generator 210 may generate first facial data corrected by performing a 3D rigid transformation of input 3D facial data based on a pre-stored 3D standard facial model. Here, the input 3D facial data may be a set of voxels corresponding to the face surface or a set of main landmark points of a face, and the first facial data may be construed as being a result of correcting the input 3D facial data to a frontal pose on X, Y, and Z coordinates. The generator 210 may include an extractor 310, an estimator 320, a calculator 330 and a transformer 340, as shown in FIG. 3A.

The extractor 310 may extract a plurality of feature points from a two-dimensional (2D) facial image acquired by projecting the input 3D facial data. The estimator 320 may estimate a pose of the input 3D facial data based on a correspondence of the extracted plurality of feature points with respect to the 3D standard facial model. The calculator 330 may calculate a first transform vector for performing a rigid transformation of the estimated pose to a frontal pose. The transformer 340 may generate the first facial data by performing a rigid transformation of the input 3D facial data based on the calculated first transform vector.

However, when there is no pre-stored 3D standard facial model, the generator 210 may generate the first facial data based on at least one feature point information obtained from the input 3D facial data. In this example, position information of feature points of main parts such as eyes, a nose, and a mouth, may be obtained from the input 3D facial data, and the generator 210 may generate first facial data associated with a frontal face of the person based on the feature point position information, without using a 3D standard facial model.

The corrector 220 may generate a first person-specific frontal model which is a bilateral symmetry model of the first facial data, and correct the first facial data by performing a 3D rigid transformation of the first facial data based on the generated first person-specific frontal model. The corrector 220 may include a model generator 350 and a transform vector calculator 360, as shown in FIG. 3B.

The model generator 350 may generate the first person-specific frontal model by symmetrically transforming and copying voxels on a first plane to a second plane based on the axis Y of the first facial data.

The transform vector calculator 360 may calculate a second transform vector for aligning the first facial data to the first person-specific frontal model using at least one of an iterative closest point (ICP) algorithm, a singular value decomposition (SVD) algorithm, and a pose from orthography and scaling with iteration (POSIT) algorithm. When the input 3D facial data is a set of a plurality of points present on the face surface three-dimensionally scanned in general, an alignment needs to be performed in a state in which a correspondence between the input 3D facial data and points of the frontal model is unknown, and thus the second transform vector may be calculated by utilizing the ICP algorithm. However, when the input 3D facial data is a set of main landmark points (for example, main feature points such as pupil center points, eye tail points, and lip end points) of a face, an alignment may be performed in a state in which the correspondence between the input 3D facial data and the points of the frontal model is known, and thus the second transform vector may be calculated by utilizing the SVD algorithm or the POSIT algorithm. Further, a scheme of resampling the input 3D facial data and the previously generated frontal model may also be possible. In this example, a correspondence between alignment subjects is known, and thus the alignment may be performed by utilizing the SVD algorithm or the POSIT algorithm. As the number of alignment subject points increases, the precision of alignment may increase. The transform vector calculator 360 may iteratively calculate the second transform vector, and compare a second value obtained as a result of the iteratively calculating to a first value which is a previous calculation result, and determine the second value to be a final transform vector when a difference between the first value and the second value is less than a predetermined threshold.

The corrector 220 may generate a second person-specific frontal model which is bilaterally symmetric on a predetermined coordinate plane of second facial data generated by performing a 3D rigid transformation of the first facial data, and additionally correct the second facial data by performing a 2D rigid transformation of the second facial data based on the generated second person-specific frontal model. In this example, the model generator 350 may remove a predetermined piece of coordinate axis information from the second facial data, and generate the second person-specific frontal model which is bilaterally symmetric based on two pieces of coordinate axis information. Further, the transform vector calculator 360 may calculate a third transform vector for aligning the second facial data to the second person-specific frontal model using at least one of the ICP algorithm, the SVD algorithm, and the POSIT algorithm, and correct the second facial data by performing a 2D rigid transformation of the second facial data based on the third transform vector. Similar to the example of calculating the second transform vector, when a correspondence between the second facial data and the second person-specific frontal model is unknown, an alignment may be performed by utilizing the ICP algorithm. When the correspondence is known, the alignment may be performed by utilizing the SVD algorithm or the POSIT algorithm.

The face pose correction apparatus 200 may perform a fine correction through a rigid transformation again by generating a frontal model specialized for the 3D input 3D facial data, after performing an initial pose correction by performing the 3D rigid transformation of the input 3D facial data. Further, during the fine correction, the face pose correction apparatus 200 may additionally perform a symmetry correction with respect to the axes Y and Z to perform a 2D rigid transformation on the X-Z plane and the X-Y plane, thereby remarkably reducing fitting errors occurring during the process of correcting the input 3D facial data to the frontal pose and further improving the accuracy of correction results.

Figure 4:
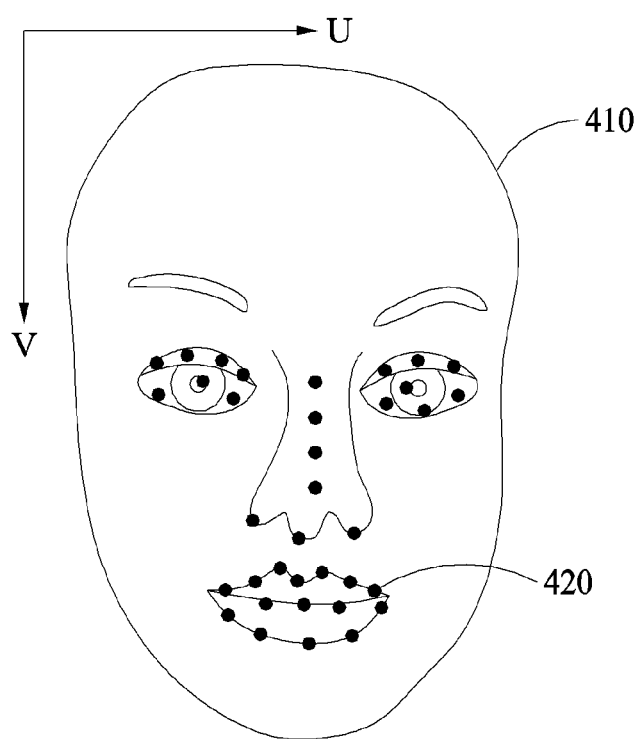
FIG. 4 illustrates a process of obtaining main landmark points using a face alignment algorithm according to an embodiment.

FIG. 4 illustrates a process of obtaining main landmark points using a face alignment algorithm according to an embodiment.

In analyzing input 3D facial data, there may be used a scheme of directly analyzing 3D data. However, in general, a scheme of analyzing 3D data using a 2D projection image acquired from a predetermined camera viewpoint is used. A 2D projection image acquired by projecting the input 3D facial data in a Z-axial direction is shown in FIG. 4. It may not be guaranteed that the input 3D facial data refers to an accurate frontal pose, and thus the 2D projection image 410 may also not be a frontal pose.

To correct the frontal pose of the input 3D facial data, a 3D standard facial model may be pre-stored. The 3D standard facial model may be generated by calculating a mean of multiple 3D facial samples measured using a 3D scanner, or by generating virtual samples corresponding to data in which multiple 3D facial samples are axially symmetric with respect to the axis Y and obtaining a mean of all the samples (the measured samples and the Y-axis symmetric virtual samples). Similar to the input 3D facial data, the 3D standard facial model may include a set of voxels corresponding to the face surface or a set of main landmark points of a face, and include 3D position information, grayscale information and color information, and should be a finally desired frontal pose.

Referring to FIG. 4, a coordinate system of the 2D projection image 410 may use the axes U and V. Projection may be performed in various manners, for example, orthogonal projection or perspective projection. Since projection is performed in the Z-axial direction, the X-Y plane of the global coordinate system may be viewed as the U-V plane. When compared to the coordinate axes of FIG. 1, the axis X of FIG. 1 and the axis U of FIG. 4 may indicate the same direction, and the axis Y of FIG. 1 and the axis V of FIG. 4 may indicate opposite directions only.

When a rigid transformation vector T to a frontal pose is applied by estimating a pose of predetermined input 3D facial data, and a 2D projection image is acquired from a camera viewpoint matching the axis Z of the global coordinate system, it is possible to extract facial feature points. In this example, the rigid transformation T is a vector which represents rotation and translation transformation with respect to the axes X, Y, and Z, and may be expressed as T: 6D vector ($\theta x$, $\theta y$, $\theta z$, tx, ty, tz).

By applying a face alignment algorithm such as an active appearance model (AAM) or a constrained local model (CLM) to the 2D projection image 410, main landmark points 420 of a facial region may be extracted. The landmark points 420 refer to main feature points of facial parts, such as pupil center points, eye tail points, and lip end points. The landmark points 420 extracted in this manner are already defined in a pre-stored 3D standard facial model, and thus 2D-3D correspondence information between the landmark points 420 and the 3D standard facial model may be obtained. The pose of the input 3D facial data may be estimated using an algorithm such as SVD or POSIT, and a rigid transformation vector T0 to initially correct the input 3D facial data to a frontal pose may be obtained. When the obtained rigid transformation T0 is applied to the input 3D facial data, initial correction data may be obtained. If the landmark points 420 are accurately extracted, the landmark points 420 may be transformed to a pose similar to the 3D standard facial model and corrected close to the frontal pose. However, due to constraints such as a morphometric difference between the 3D standard facial model and the input 3D facial data, the position accuracy of the landmark points extracted by the face alignment algorithm, and the limited number of landmark points extracted, correction to a finer frontal pose is needed.

Figure 5B:
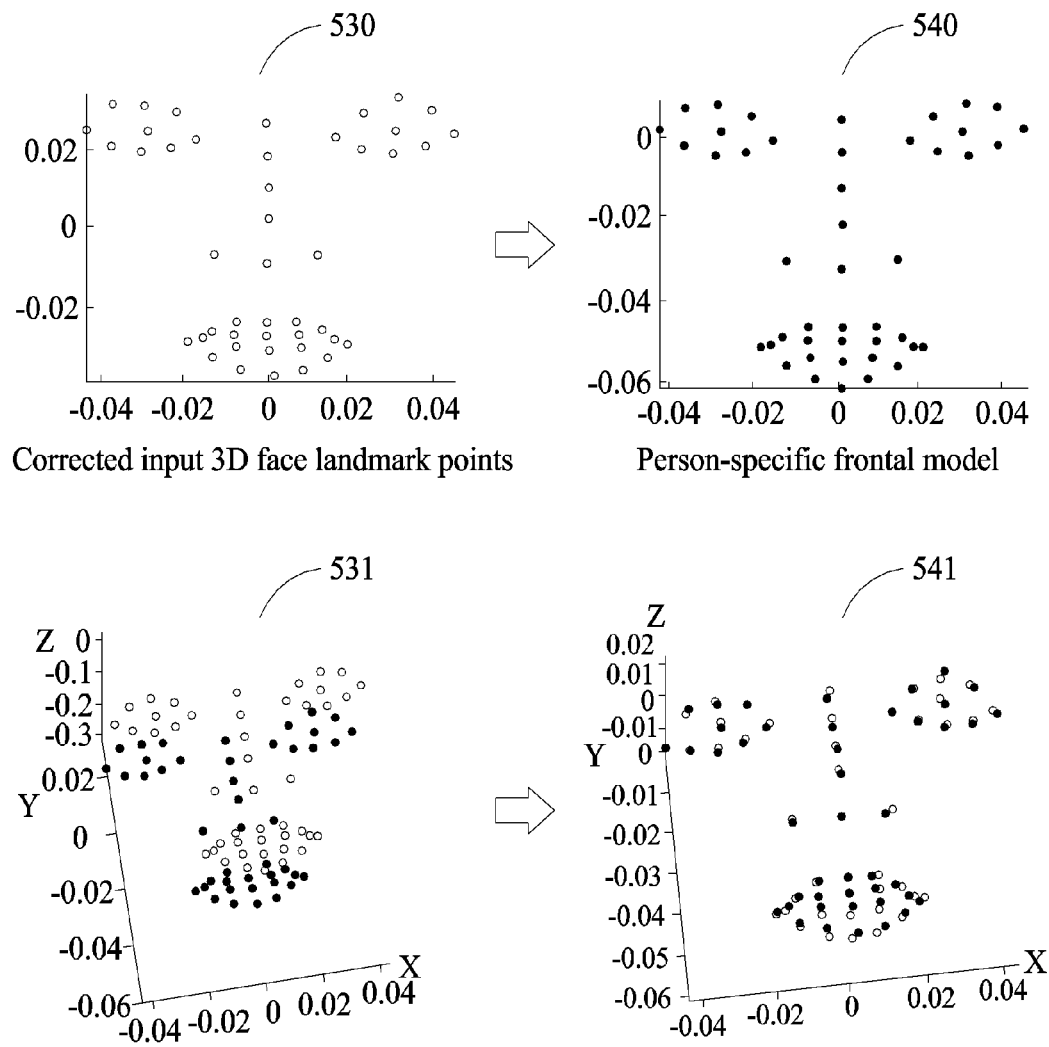
Figure 5C:
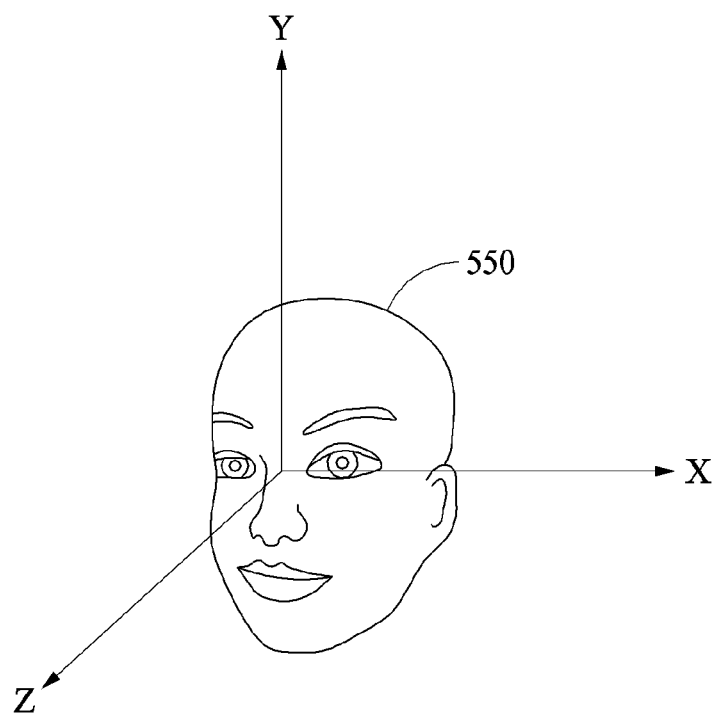

FIGS. 5A, 5B and 5C illustrate an example of generating a person-specific frontal model, and correcting a pose of 3D facial data using the generated person-specific frontal model according to an embodiment.

For fine frontal pose correction with respect to input 3D facial data, a person-specific frontal model specialized for the input 3D facial data needs to be generated. The person-specific frontal model refers to a model which is bilaterally symmetric based on the axis Y, and may be generated by symmetrically transforming and copying voxels on the left side to the right side based on the axis Y (or by symmetrically transforming and copying voxels on the right side to the left side based on the axis Y). As described above with reference to FIG. 4, when the input 3D facial data is initially corrected using the rigid transformation vector T0, a first person-specific frontal model which is a person-specific frontal model with respect to the initially corrected first facial data may be generated. The first person-specific frontal model may be construed as a bilateral symmetry model of the first facial data, and a 3D rigid transformation vector T1 may be calculated through an alignment of the first facial data and the first person-specific frontal model.

The input 3D facial data may include a set of voxels corresponding to the face surface or a set of fewer voxels (for example, main landmark points of a face). A different type of person-specific frontal model may be generated depending on a type of the input 3D facial data.

When the input 3D facial data corresponds to a set of voxels corresponding to the face surface, initially corrected first facial data 510 and a first person-specific frontal model 520 may also include multiple voxels corresponding to the face surface, as shown in FIG. 5A. In this example, an alignment is to be performed while a correspondence between the first facial data 510 and points of the first person-specific frontal model 520 is unknown. Thus, an ICP algorithm may be utilized to calculate the rigid transformation vector T1. A result 511 before the alignment using the ICP algorithm and a result 521 after the alignment are shown on the bottom of FIG. 5A.

When the input 3D facial data corresponds to a set of main landmark points of a face, initially corrected first facial data 530 and a first person-specific frontal model 540 may also be generated using the main landmark points, as shown in FIG. 5B. In this example, an alignment may be performed while a correspondence between the first facial data 530 and points of the first person-specific frontal model 540 is known. Thus, an SVD algorithm or a POSIT algorithm may be utilized to calculate the rigid transformation vector T1. A result 531 before the alignment using the SVD algorithm or the POSIT algorithm and a result 541 after the alignment are shown in FIG. 5B.

In addition to the examples of FIGS. 5A and 5B, the person-specific frontal model may be generated in various manners. For example, an improved person-specific frontal model may be generated by resampling the first person-specific frontal model generated in FIG. 5A and the first data. In this example, resampling may be performed by dividing the first person-specific frontal model 520 into grids based on the coordinates X and Y as shown in FIG. 5C, and extracting or calculating a representative voxel from each grid (calculating an average of coordinates x, y and z of voxels belonging to each grid, or selecting a voxel closest to the coordinates x, y and z representing each grid). In the same manner, the first data 510 may also be resampled. The two models resampled using the same grids may be aligned while a correspondence between alignment subjects is known. Thus, the SVD algorithm or the POSIT algorithm may be utilized to calculate the rigid transformation vector T1, as shown in FIG. 5B. In some examples, an alignment may be performed after an improved person-specific frontal model is generated by resampling the first person-specific frontal model 540 and the first data 530 of FIG. 5B.

Figure 6A:
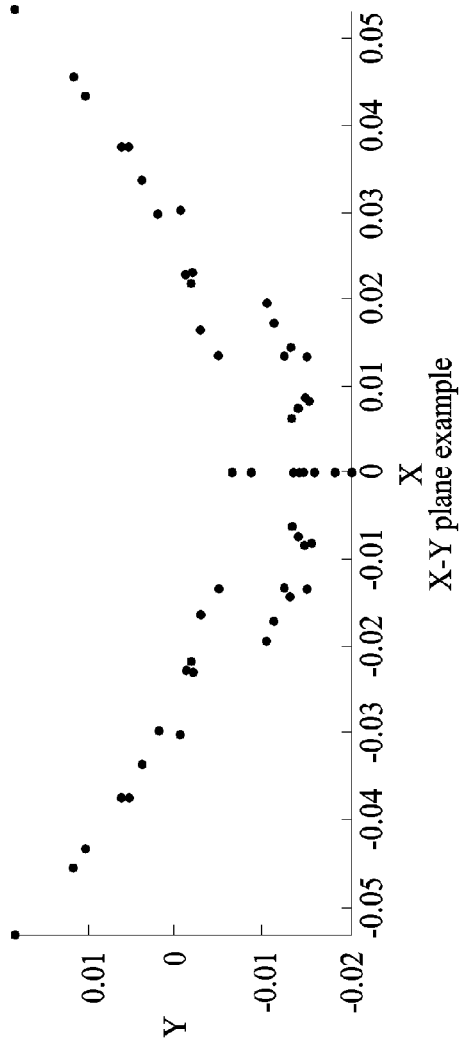
FIGS. 6A, 6B and 6C illustrate examples of two-dimensional (2D) rigid transformations performed according to an embodiment.
Figure 6B:
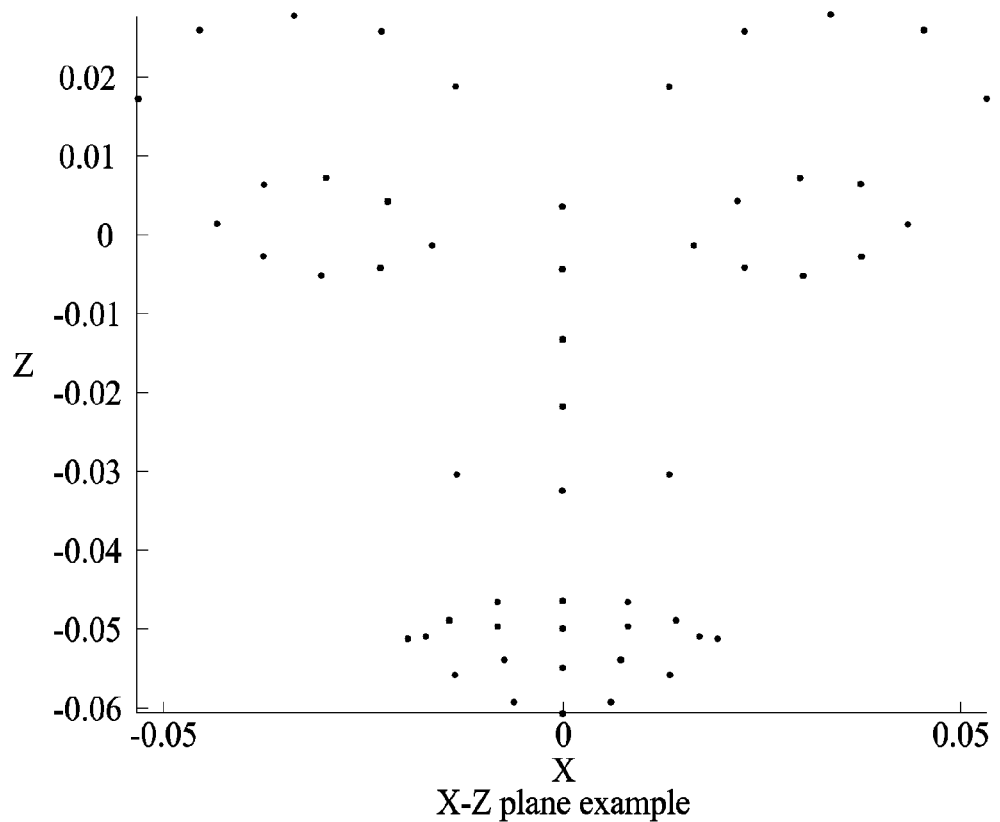
Figure 6C:
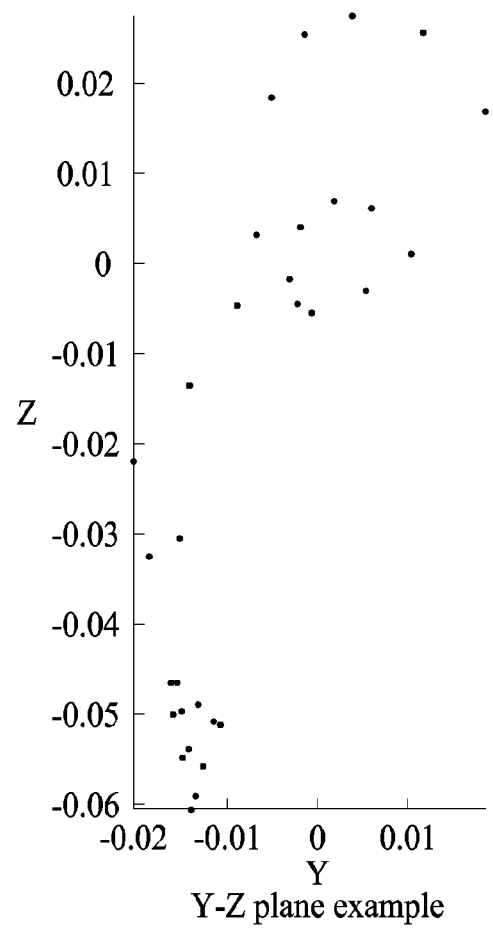

FIGS. 6A, 6B and 6C illustrate examples of 2D rigid transformations performed according to an embodiment.

For fine frontal pose correction with respect to input 3D facial data, a frontal correction with respect to the axes Y and Z may be additionally performed. The frontal correction may be performed by performing a 2D rigid transformation on the X-Z plane and the X-Y plane.

Only a predetermined piece of coordinate axis information may be removed from second facial data generated through the corrections of FIGS. 5A, 5B, and 5C, and a second person-specific frontal model which is a person-specific frontal model with respect to the second facial data may be generated. The second person-specific frontal model may be construed as a bilateral symmetry model of the second facial data, and a 2D rigid transformation vector T2 may be calculated through an alignment of the second facial data and the second person-specific frontal model. If a pose correction is performed on 2D coordinates, the stability of alignment results may be higher than a pose correction on 3D coordinates, and it may be easily applicable even when manually performed by others in the future. The frontal pose may be defined by bilateral symmetry on the X-Y plane of FIG. 6A and the X-Z plane of FIG. 6B. However, on the Y-Z plane as shown in FIG. 6C, it may be performed by extracting an angle of a representative line through line fitting in a region between the head and the chin and then correcting with respect to X-axial rotation.

Meanwhile, the rigid transformation vectors T1 and T2 used for the fine pose correction may be repeatedly calculated until calculation results converge. The process of calculating the rigid transformation vector T1 of FIGS. 5A, 5B, and 5C and the process of calculating the rigid transformation vector T2 of FIGS. 6A, 6B, and 6C may be repeatedly performed n times, and the repetition may be terminated by comparing an n-th calculation result and an (n−1)-th calculation result and determining that the calculation results converge when a difference therebetween is less than a predetermined threshold, and the n-th calculation result may be determined to be a final rigid transformation vector T.

Figure 7:
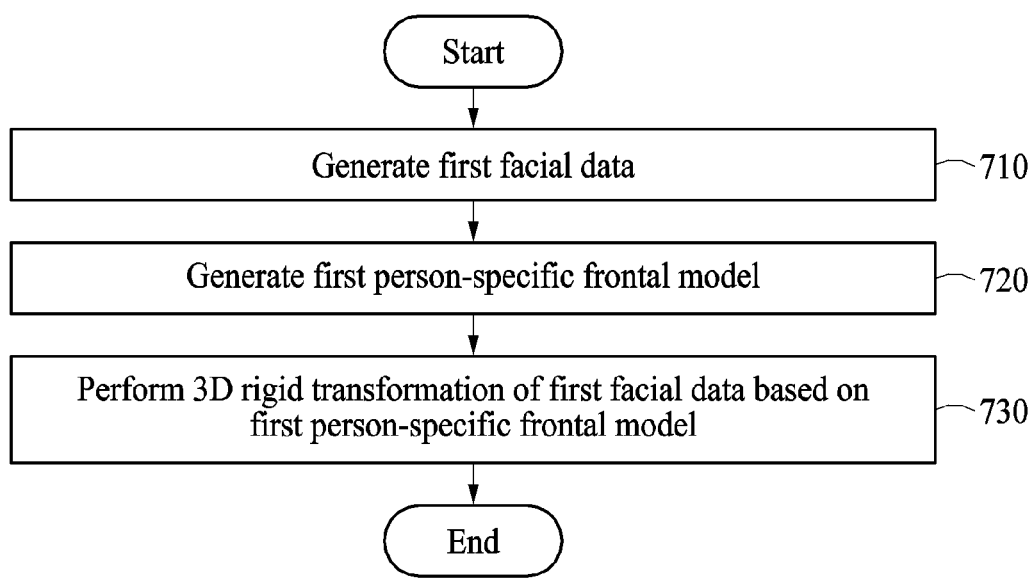
FIG. 7 is a flowchart illustrating a face pose correction method according to an embodiment.

FIG. 7 is a flowchart illustrating a face pose correction method according to an embodiment.

A face pose correction apparatus may be a means to correct to a frontal pose using a person-specific frontal model specialized for facial data of a person, and may provide a method of greatly reducing fitting errors occurring during a process of aligning input 3D facial data to a 3D standard facial model while performing a pose correction in a relatively simple manner.

In operation 710, a generator of the face pose correction apparatus may generate first facial data corrected by performing a 3D rigid transformation of input 3D facial data based on a pre-stored 3D standard facial model. Here, the input 3D facial data may be a set of voxels corresponding to the face surface or a set of main landmark points of a face, and the first facial data may be construed as a result of correcting the input 3D facial data to a frontal pose on X, Y, and Z coordinates.

In operation 710, the generator may extract a plurality of feature points from a 2D facial image acquired by projecting the input 3D facial data, and estimate a pose of the input 3D facial data based on a correspondence of the extracted plurality of feature points with respect to the 3D standard facial model. Further, the generator may calculate a first transform vector for performing a rigid transformation of the estimated pose to a frontal pose, and generate the first facial data by performing a rigid transformation of the input 3D facial data based on the calculated first transform vector.

However, when there is no pre-stored 3D standard facial model, the generator may generate the first facial data based on at least one feature point information obtained from the input 3D facial data, in operation 710. In this example, position information of feature points of main parts such as eyes, a nose, and a mouth, may be obtained from the input 3D facial data, and the generator may generate first facial data associated with a frontal face of the person based on the feature point position information, without using a 3D standard facial model.

In operation 720, a corrector of the face pose correction apparatus may generate a first person-specific frontal model which is a bilateral symmetry model of the first facial data. In operation 720, the corrector may generate the first person-specific frontal model by symmetrically transforming and copying voxels on a first plane to a second plane based on the axis Y of the first facial data.

In operation 730, the corrector may correct the first facial data by performing a 3D rigid transformation of the first facial data based on the first person-specific frontal model generated in operation 720. For this, the corrector may calculate a second transform vector for aligning the first facial data to the first person-specific frontal model using at least one of an ICP algorithm, an SVD algorithm, and a POSIT algorithm. When the input 3D facial data is a set of a plurality of points present on the face surface three-dimensionally scanned in general, an alignment needs to be performed in a state in which a correspondence between the input 3D facial data and points of the frontal model is unknown, and thus the second transform vector may be calculated by utilizing the ICP algorithm. However, when the input 3D facial data is a set of main landmark points (for example, main feature points such as pupil center points, eye tail points, and lip end points) of a face, an alignment may be performed in a state in which the correspondence between the input 3D facial data and the points of the frontal model is known, and thus the second transform vector may be calculated by utilizing the SVD algorithm or the POSIT algorithm. Further, a scheme of resampling the input 3D facial data and the previously generated frontal model may also be possible. In this example, a correspondence between alignment subjects is known, and thus the alignment may be performed by utilizing the SVD algorithm or the POSIT algorithm. As the number of alignment subject points increases, the precision of alignment may increase.

In operation 730, the corrector may iteratively calculate the second transform vector, and compare a second value obtained as a result of the iteratively calculating to a first value which is a previous calculation result, and determine the second value to be a final transform vector when a difference between the first value and the second value is less than a predetermined threshold.

After operation 730, the corrector may generate a second person-specific frontal model which is bilaterally symmetric on a predetermined coordinate plane of second facial data generated by performing a 3D rigid transformation of the first facial data, and additionally correct the second facial data by performing a 2D rigid transformation of the second facial data based on the generated second person-specific frontal model. In this example, the corrector may remove a predetermined piece of coordinate axis information from the second facial data, and generate the second person-specific frontal model which is bilaterally symmetric based on two pieces of coordinate axis information. Further, the corrector may calculate a third transform vector for aligning the second facial data to the second person-specific frontal model using at least one of the ICP algorithm, the SVD algorithm, and the POSIT algorithm, and correct the second facial data by performing a 2D rigid transformation of the second facial data based on the third transform vector. Similar to the example of calculating the second transform vector, when a correspondence between the second facial data and the second person-specific frontal model is unknown, an alignment may be performed by utilizing the ICP algorithm. When the correspondence is known, the alignment may be performed by utilizing the SVD algorithm or the POSIT algorithm.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A face pose correction apparatus, comprising:
   a data generator configured to generate first facial data corrected by performing a three-dimensional (3D) rigid transformation of input 3D facial data based on a pre-stored 3D standard facial model; and
   a corrector comprising a model generator configured to generate a first person-specific frontal model which is a bilateral symmetry model of the first facial data, and comprising a data corrector configured to correct the first facial data by performing a 3D rigid transformation of the first facial data based on the generated first person-specific frontal model;
   wherein the model generator is configured to generate a second person-specific frontal model which is bilaterally symmetric on a predetermined coordinate plane of second facial data generated by performing a 3D rigid transformation of the first facial data, and the data corrector is additionally configured to correct the second facial data by performing a 2D rigid transformation of the second facial data based on the generated second person-specific frontal model.

2. The face pose correction apparatus of claim 1, wherein the data generator comprises:
   a feature point extractor configured to extract a plurality of feature points from a two-dimensional (2D) facial image acquired by projecting the input 3D facial data;
   an estimator configured to estimate a pose of the input 3D facial data based on a correspondence of the extracted plurality of feature points with respect to the 3D standard facial model;
   a calculator configured to calculate a first transform vector for performing a rigid transformation of the estimated pose to a frontal pose; and
   a data transformer configured to generate the first facial data by performing a rigid transformation of the input 3D facial data based on the first transform vector.

3. The face pose correction apparatus of claim 1, wherein:
   the model generator is configured to generate the first person-specific frontal model by symmetrically transforming and copying voxels on a first plane to a second plane based on an axis Y of the first facial data; and
   the corrector further comprises a transform vector calculator configured to calculate a second transform vector for aligning the first facial data to the first person-specific frontal model using at least one of an iterative closest point (ICP) algorithm, a singular value decomposition (SVD) algorithm, and a pose from orthography and scaling with iteration (POSIT) algorithm, and correct the first facial data by performing a 3D rigid transformation of the first facial data based on the second transform vector.

4. The face pose correction apparatus of claim 3, wherein the transform vector calculator is configured to compare a second value obtained by iteratively calculating the second transform vector to a first value which is a previous calculation result, and determine a final transform vector when a difference between the first value and the second value is less than a predetermined threshold as a result of the comparing.

5. The face pose correction apparatus of claim 3, wherein the model generator is configured to remove a predetermined piece of coordinate axis information from the second facial data, and generate the second person-specific frontal model which is bilaterally symmetric based on two pieces of coordinate axis information, and the transform vector calculator is configured to calculate a third transform vector for aligning the second facial data to the second person-specific frontal model using at least one of the ICP algorithm, the SVD algorithm, and the POSIT algorithm, and correct the second facial data by performing a 2D rigid transformation of the second facial data based on the third transform vector.

6. A face pose correction apparatus, comprising:
a data generator configured to generate first facial data associated with a frontal face of a person based on at least one facial feature point obtained from input three-dimensional (3D) facial data; and
a corrector comprising a model generator configured to generate a person-specific frontal model which is a bilateral symmetry model of the first facial data, and comprising a data corrector configured to correct the first facial data by performing a 3D rigid transformation of the first facial data based on the generated person-specific frontal model;
wherein the model generator is configured to generate a second person-specific frontal model which is bilaterally symmetric on a predetermined coordinate plane of second facial data generated by performing a 3D rigid transformation of the first facial data, and the data corrector is additionally configured to correct the second facial data by performing a 2D rigid transformation of the second facial data based on the generated second person-specific frontal model.

7. The face pose correction apparatus of claim 6, wherein:
the model generator is configured to generate the person-specific frontal model by symmetrically transforming and copying voxels on a first plane to a second plane based on an axis Y of the first facial data; and
the corrector further comprises a transform vector calculator configured to calculate a transform vector for aligning the first facial data to the person-specific frontal model using at least one of an iterative closest point (ICP) algorithm, a singular value decomposition (SVD) algorithm, and a pose from orthography and scaling with iteration (POSIT) algorithm.

8. A face pose correction method utilizing a face pose correction apparatus comprising a data generator, a model generator, and a data corrector, the method comprising:
generating, by the data generator, first facial data corrected by performing a three-dimensional (3D) rigid transformation of input 3D facial data based on a pre-stored 3D standard facial model;
generating, by the model generator, a first person-specific frontal model which is a bilateral symmetry model of the first facial data, and correcting, by the data corrector, the first facial data by performing a 3D rigid transformation of the first facial data based on the generated first person-specific frontal model;
generating, by the model generator, a second person-specific frontal model which is bilaterally symmetric on a predetermined coordinate plane of second facial data generated by performing a 3D rigid transformation of the first facial data; and
additionally correcting, by the data corrector, the second facial data by performing a 2D rigid transformation of the second facial data based on the generated second person-specific frontal model.

9. The face pose correction method of claim 8, wherein the data generator comprises a feature point extractor, an estimator, a calculator, and a data transformer, and the generating of the first facial data comprises:
extracting, by the feature point extractor, a plurality of feature points from a two-dimensional (2D) facial image acquired by projecting the input 3D facial data;
estimating, by the estimator, a pose of the input 3D facial data based on a correspondence of the extracted plurality of feature points with respect to the 3D standard facial model;
calculating, by the calculator, a first transform vector for performing a rigid transformation of the estimated pose to a frontal pose; and
generating, by the data transformer, the first facial data by performing a rigid transformation of the input 3D facial data based on the first transform vector.

10. The face pose correction method of claim 8, wherein:
the generating, by the model generator, of the first person-specific frontal model comprises symmetrically transforming and copying voxels on a first plane to a second plane based on an axis Y of the first facial data;
the method further comprises calculating, by the calculator, a second transform vector for aligning the first facial data to the first person-specific frontal model using at least one of an iterative closest point (ICP) algorithm, a singular value decomposition (SVD) algorithm, and a pose from orthography and scaling with iteration (POSIT) algorithm; and
correcting by the data corrector, the first facial data by performing a 3D rigid transformation of the first facial data based on the second transform vector.

11. The face pose correction method of claim 10, wherein the face pose correction apparatus further comprises a transform vector calculator, the method further comprising:
comparing, by the transform vector calculator, a second value obtained by iteratively calculating the second transform vector to a first value which is a previous calculation result; and
determining, by the transform vector calculator, a final transform vector when a difference between the first value and the second value is less than a predetermined threshold as a result of the comparing.

12. The face pose correction method of claim 8, wherein the face pose correction apparatus further comprises a calculator, the additionally correcting comprises:
removing, by the model generator, a predetermined piece of coordinate axis information from the second facial data, and generating, by the model generator, the second person-specific frontal model which is bilaterally symmetric based on two pieces of coordinate axis information;
calculating, by the calculator, a third transform vector for aligning the second facial data to the second person-specific frontal model using at least one of an ICP algorithm, an SVD algorithm, and a POSIT algorithm; and
correcting, by the data corrector, the second facial data by performing a 2D rigid transformation of second facial data based on the third transform vector.

* * * * *